United States Patent [19]

Blumenfeld

[11] Patent Number: 4,662,927
[45] Date of Patent: May 5, 1987

[54] GLASS TEMPERATURE PRECONDITIONING SYSTEM IN A DISTRIBUTION CHANNEL

[75] Inventor: John F. Blumenfeld, Simsbury, Conn.

[73] Assignee: Emhart Industries, Inc., Farmington, Conn.

[21] Appl. No.: 809,788

[22] Filed: Dec. 17, 1985

[51] Int. Cl.[4] ............................................. C03B 5/225
[52] U.S. Cl. ...................................... 65/162; 65/136; 65/137; 65/337; 65/346
[58] Field of Search ................. 65/137, 136, 337, 346, 65/347, 162

[56] References Cited

U.S. PATENT DOCUMENTS

| | | | |
|---|---|---|---|
| 2,119,949 | 6/1938 | Blau et al. | 65/337 UX |
| 2,121,958 | 6/1938 | Forman et al. | 65/137 X |
| 3,582,310 | 6/1971 | Avery et al. | 65/346 |
| 4,294,603 | 10/1981 | Winzer et al. | 65/346 |
| 4,552,579 | 11/1985 | Blumenfeld et al. | 65/346 |

Primary Examiner—Arthur Kellogg
Attorney, Agent, or Firm—H. Samuel Kieser

[57] ABSTRACT

Temperature conditioning of molten glass flowing from a melter to a glassware-forming machine is described. In addition to the attempt at conditioning the molten glass in the forehearth in the usual manner, in accordance with this invention, distribution channels leading from the throat of the molten glass supply to the forehearth are provided with conditioning apparatus. Most particularly, the conditioning apparatus is such that the conditioning temperatures at the opposite sides of the distribution channel may be varied. For example, at one side the interior of the distribution channel may be being heated while the opposite side is being cooled. It is also possible to heat one side to a greater degree than the other while heating both sides. Most particular, the burner construction is such that the burners may be utilized either to heat the interior of the distribution channel or to cool the same. Combustion supporting air is delivered to the burners from a separate source and, when the burner is not being utilized for heating purposes, the same air may be utilized for cooling purposes.

18 Claims, 8 Drawing Figures

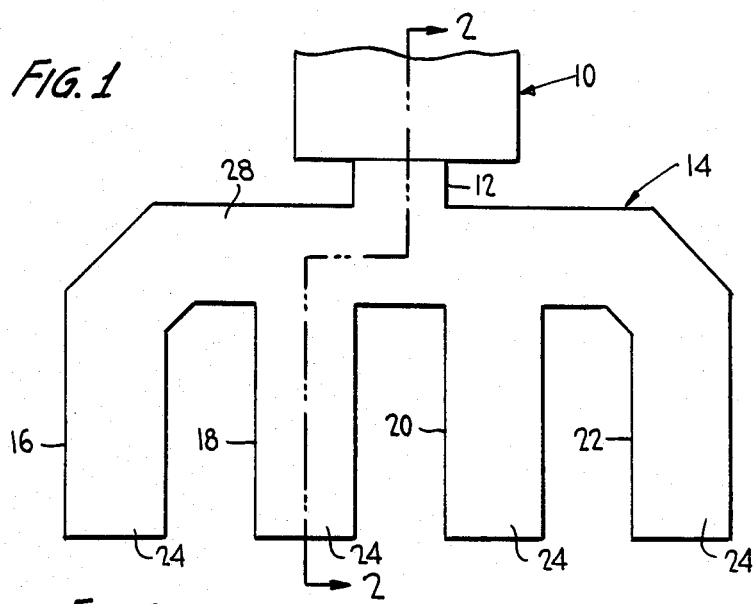
FIG. 1
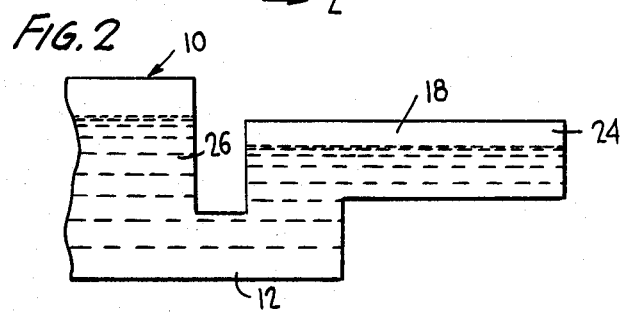
FIG. 2
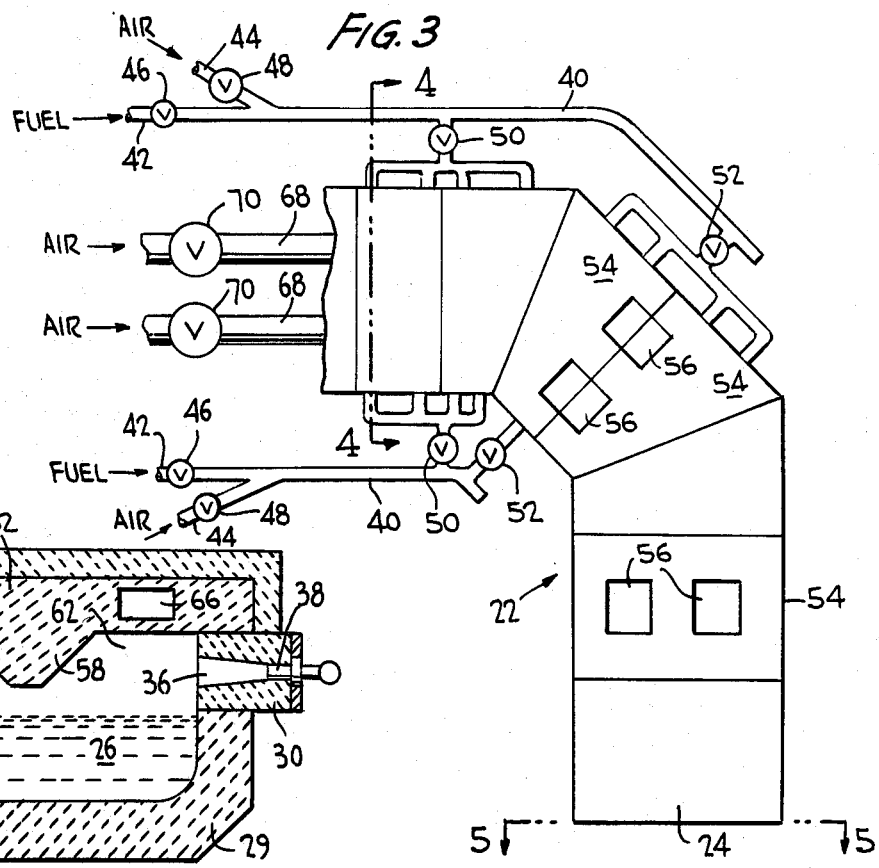
FIG. 3
FIG. 4

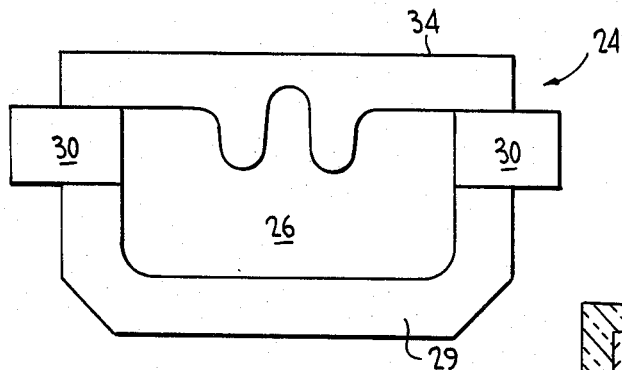
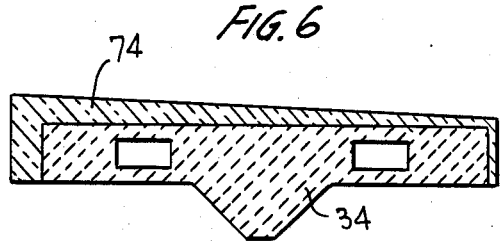
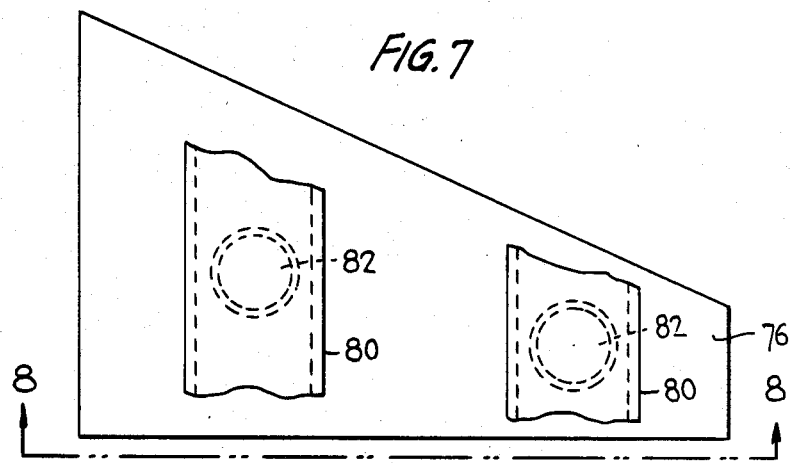
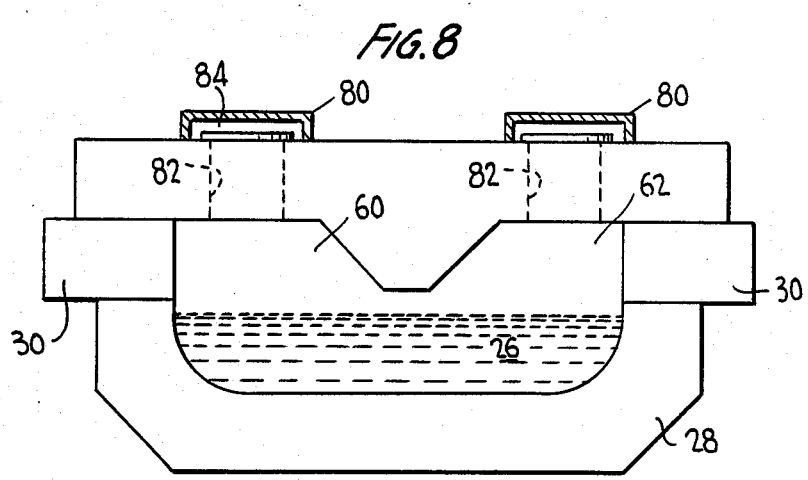

GLASS TEMPERATURE PRECONDITIONING SYSTEM IN A DISTRIBUTION CHANNEL

This invention relates in general to new and useful improvements in the conveyance of molten glass, and more particularly to a glass temperature preconditioning system wherein suitable means are provided in association with a distribution channel to effect a uniform temperature cross-section of flowing molten glass within the distribution channel.

In the operation of glassmaking furnaces to produce glass for container manufacture, it is normal practice for the molten glass to issue from the glass melting furnace through a "submerged throat," and to flow into a "nose" (sometimes called a "refiner"), "alcove," or "distributing chamber." These terms are well understood and will not be defined herein. From the nose, alcove or distributing chamber, the glass flows into one or more forehearths where it is thermally conditioned to be suitable for gob-forming.

In general, there is very little opportunity to adjust the thermal uniformity of the glass entering the forehearths because of the construction of the nose, alcove or distributing chamber; also because the average time of transit of the glass from the throat to the forehearth is short, and also because the temperature of glass flowing in the direction of any forehearth is affected by the rate of flow to other forehearths.

For these reasons, the temperature uniformity of glass entering a forehearth is often poor, and the temperature profile will often change throughout the day. This may impose a significant burden on the forehearth, and tax its capability of thermally conditioning the glass to provide a relatively uniform temperature profile at the forehearth exit (or spout entrance). Therefore, it would be desirable to thermally precondition the glass before it enters the forehearth in order to avoid large temperature non-uniformities.

In addition to the foregoing, molten glass flowing through the distribution channels often involves a right-angle, or other angular turn which further detracts from the thermal uniformity. This is a result of the greater amount of surface area of the channel on the outside of the turn, which permits more heat loss to occur on the outside as opposed to the inside of the turn.

In accordance with this invention, it is proposed not to rely solely upon the temperature conditioning effected in the forehearth, but to provide the distribution channel with temperature conditioning means.

More particularly, it is proposed to provide temperature conditioning means along opposite sides of the distribution channel which are separately controllable wherein the glass passing along opposite sides of the distribution channel may be differently heated, or the molten glass passing along one side may be heated while the molten glass passing along the other side may be cooled.

Another feature of this invention is to provide insulation for at least the roof of the distribution channel and wherein the insulation may vary from one side to the other in accordance with the temperature loss of the flowing molten glass within the distribution channel.

Another feature of the invention is to provide burner assemblies which include an air supply wherein the burners along one side of the distribution channel may be operative as burners, and the burners along the opposite side of the distribution channel may have the air supply therefor directed into the distribution channel as a coolant.

In the drawing, wherein throughout like numerals refer to like parts,

FIG. 1 is a schematic plan view of a typical molten glass distribution system which has been improved in accordance with this invention;

FIG. 2 is a longitudinal vertical sectional view taken along the line 2—2 of FIG. 1 and shows generally glass flow from a molten glass tank through the distribution system to a forehearth;

FIG. 3 is an enlarged fragmentary plan view showing one leg of the distribution channel with the conditioning means associated therewith being schematically illustrated;

FIG. 4 is an enlarged transfer sectional view taken generally along the line 4—4 of FIG. 3 and shows the general cross-section of the distribution channel;

FIG. 5 is an enlarged transfer vertical sectional view taken generally along the line 5—5 of FIG. 3 and shows the cross-section of the forehearth;

FIG. 6 is a schematic sectional view taken through a roof block and shows the differential insulation thereof;

FIG. 7 is a plan view of one roof block having a modified cooling means; and

FIG. 8 is a transfer vertical sectional view taken generally along the line 8—8 of FIG. 7 and shows the constructional details of the roof block and its relationship to the remainder of the distribution channel.

Referring now to the drawings in detail, reference is first made to FIG. 1 where there is illustrated the distribution end of a glass melter, generally identified by the numeral 10. The melter delivers through a throat 12 molten glass to a molten glass distribution system generally identified by the numeral 14.

In the illustrated embodiment of the invention, the distribution system 14 includes four channels 16, 18, 20 and 22. Each of the distribution channels terminates in a forehearth 24. A typical cross-section through the melter and molten glass distribution system is shown in FIG. 2 wherein the submerged position of the throat 12 with respect to molten glass 26 within the melter 10 is clearly illustrated. It will be seen that the molten glass flows upwardly from the throat 12 into a transfer distribution channel 28 and then into the distribution channel 18.

It will be further obvious from FIG. 1 that the flow paths through the distribution channels 18, 20 are much shorter than those through the channels 16, 22. Further, it will be seen that the flow path within the distribution channels 16, 22 includes a right-angle turn. As a result, the molten glass flowing in the distribution channels 16, 22 travels a greater distance at one side than at the other. Thus, the molten glass is subjected to a greater cooling at one side of the distribution channels 16, 22 than at the other.

Distribution channel 22, therefore, clearly illustrates the need for the present invention. It will be readily apparent that the temperature cross-section of the molten glass flowing in the distribution channel 22 is greatly varied in view of the fact that the glass flowing along one side of the distribution channel 22 travels a considerably greater distance than that along the opposite side. Further, it will be seen that a temperature cross-section will be so varied that it is not feasible for the glass to be conditioned in the forehearth 24 so as to provide for a generally uniform temperature distribution cross-section.

The distribution channel 22 is typical and is formed of a plurality of sections. As shown in FIG. 4, each section is constituted by a plurality of blocks. First of all, there is a base block 29 in which the molten glass 26 flows. Seated on the upper edges of the base block 29 are burner blocks 30. The burner blocks 30, in turn, support a roof block 32.

The above-described construction of the distribution channel 22 also applies generally to the forehearth 24, as is best shown in FIG. 5. The forehearth 24 includes a generally channel-shaped base block 29 in which the molten glass flows. Forehearth 24 also includes burner blocks 30 and a roof block, which roof block is different from the roof block 32 and is identified by the numeral 34.

It is customary in forehearths to uniformly heat opposite sides of the forehearth so as to effect the proper conditioning of the flowing molten glass 26. However, it is believed to be novel to condition the molten glass within the distribution channel in accordance with this invention. This provides much greater control of the conditioning of the molten glass.

Referring once again to FIGS. 3 and 4, first of all it is pointed out that the burner blocks 30 are provided with heating ports 36 into which project burner nozzles 38. The burner nozzles 38, when operative, direct a flame into the associated burner port 36 so as to heat the space above the flowing molten glass 26.

In accordance with this invention, there may be modifications in the burners 38. Further, there are controls for the burners 38 which provide for a maximum heat control.

As is schematically shown in FIG. 3, a combination of fuel and air is directed to the burners 38 through a supply line 40. At this time it is pointed out that the fuel and air may be mixed within the supply line 40, or the supply line 40 may constitute in actuality two different lines, one supplying the fuel to the burner and one supplying air. Accordingly, there is a separate fuel supply 42 and a separate air supply 44. These supplies are controlled by valves 46 and 48, respectively. In addition, the supply line 40 is provided with suitable control valves 50, 52 which permit regulation of burners in groups, or zones, in order to effect the desired heat application to the glass.

At the opposite side of the distribution channel 22, the burners are connected together by a like set-up including a supply line 40, separate fuel and air supplies 42, 44 controlled by valves 46, 48, respectively, and additional control valves 50, 52.

As will be readily apparent from FIG. 4, effectively each burner 38 heats its associated one-half of the distribution channel 22. Further, as is shown in FIG. 3, roof blocks 54 of the distribution channel 22 are provided with exhaust openings 56 through which exhaust gases may pass.

It will be readily apparent from the foregoing that the interior of the distribution channel 22 may be heated along the outer side thereof while the inner side thereof may feasibly be cooled. This is by having the burners on the outer side operative and the burners on the inner side inoperative, but with the air supply being connected to those burners for directing cooling air through the burners, if desired.

In addition, the amount of heat supplied to either side may be controlled by controlling the rate at which air and gas mixture is supplied to the burners through valves 50, 52.

It is to be particularly noted that the roof block 32 is provided with a depending rib 58 which divides the space above the molten glass 26 into two longitudinal combustion chambers 60, 62. In the manner described above, the temperature within the two chambers 60, 62 may be greatly varied. It is to be understood that the exhaust openings 56 are in direct communication with the tops of the chambers 60, 62.

In addition to supplying cooling air though the burners 38, the roof blocks 32 of the distribution channel 22, as well as the other distribution channels, may be supplied with cooling air ducts 66 which generally overlie the combustion chambers 60, 62. The ducts are not in communication with the chambers 60, 62, but provide for cooling by permitting the molten glass to radiate heat energy upward to the lower surface of the roof block 32, which then conducts this heat upward to the ducts 66 where the heat is transferred to a cooling air stream flowing through the duct.

Referring once again to FIG. 3, it will be schematically shown that the air ducts 66 are provided with supply lines 68 in which are incorporated control valves 70. Each of the control valves 70 controls the supply of air under pressure from a suitable air source so that air may be directed into one only of the air supply ducts 66.

At this time, it is to be noted that the burners 38 could be operative along one side of the distribution channel 22 while cooling air is directed into the opposite side of the distribution channel through the burners 38, and additional cooling air is directed into the duct 66 on the opposite side of the channel.

It is customary to cover at least the roof blocks 32 with insulation 72. In accordance with this invention, as is best shown in FIG. 6, the roof blocks 32 may be covered with insulation 74 which is varied in thickness in accordance with the heat loss desired across the width of the distribution channel 22. Since the naturally occurring heat loss is usually greater along one side of the distribution channel 22, the insulation 74 should be the maximum thereon.

Referring now to FIGS. 7 and 8, it will be seen that there is illustrated a slightly modified form of roof block construction. The illustrated roof block is identified by the numeral 76, while the remainder of the construction of the distribution channel is the same as that shown in FIG. 4. However, instead of having the air ducts 66 formed therein, the air ducts, identified by the numeral 80, are mounted on the top of the roof block 76. In order to enhance the rate of cooling accomplished by the cooling air, vertical ports 82 are cast into or drilled through the roof blocks at intervals within the area of the cooling tunnels. The ports are covered with thin, thermally conductive refractory plates 84, in order to isolate chambers 60, 62 from ducts 66. This method effectively reduces the thickness of the roof block at intervals and thereby increases the rate of cooling and the responsiveness of the cooling of glass to changes in air flow rates.

It is to be understood that the distribution channel construction of FIGS. 7 and 8 will be generally insulated in the manner shown in FIG. 6. Further, the burners 38 and the supply thereto (not shown) will be that shown in FIGS. 3 and 4.

Although only several preferred embodiments of conditioning means for the distribution channel have been specifically illustrated and described herein, it is to be understood that minor variations may be made in the conditioning means without departing from the spirit and scope of the invention as defined by the appended claims.

It is claimed:

1. In a glass distribution system wherein a stream of molten glass is conveyed from a source of molten glass through a distribution channel to a forehearth, said distribution channel having two opposite sides, conditioning means carried by said distribution channel for effecting a substantially uniform temperature cross-section across the molten glass stream within said distribution channel, said conditioning means extending along said opposite sides and including a separate heat-transfer system for each of said sides, each said heat transfer system including means for heating said glass and means for cooling said glass along its respective side portion, whereby the glass stream along one side of said distribution channel may be heated while the glass stream along the opposite side is being cooled.

2. In a glass distribution system according to claim 1 wherein said heating means and said cooling means are in the form of burners having separate fuel and air supplies, and wherein said air supply per se forms said cooling means.

3. In a glass distribution system according to claim 1, wherein said heating means includes burners and there are separate cooling means.

4. In a glass distribution system according to claim 1, wherein said heating means includes burners and there are separate cooling means in the form of air supply means.

5. In a glass distribution system according to claim 2 wherein said cooling means also includes a cooling means separate from said burners.

6. In a glass distribution system according to claim 2 wherein said cooling means also includes a cooling means separate from said burners and is in the form of air supply means.

7. In a glass distribution system according to claim 2 wherein said cooling means also includes a separate cooling means in the form of openings in a roof for said distribution channel, and there is associated with said openings heat-transfer elements.

8. In a glass distribution system according to claim 2 wherein said cooling means also includes a separate cooling means in the form of openings in a roof for said distribution channel, and there is associated with said openings heat-transfer elements in the form of thermally conductive plates.

9. In a glass distribution system according to claim 2 wherein said cooling means also includes a separate cooling means in the form of openings in a roof for said distribution channel, and there is associated with said openings heat-transfer elements in the form of thermally conductive plates of refractory.

10. In a glass distribution system according to claim 2 wherein said cooling means also includes a separate cooling means in the form of openings in a roof for said distribution channel, and there is associated with said openings heat-transfer elements in the form of thermally conductive plates positioned in air channels.

11. In a glass distribution system according to claim 2 wherein said cooling means also includes a separate cooling means, said distribution channel including a roof defined by roof blocks, and said separate cooling means including air supply ducts in said roof blocks, and air distribution passages through said roof blocks.

12. In a glass distribution system according to claim 1 wherein said distribution channel includes a bend with molten glass flowing through said distribution channel at one side of said distribution channel having a longer path of travel than along the other side.

13. In a glass distribution system according to claim 11 wherein the roof of said distribution channel is insulated with said insulation being of a different thickness along opposite side portions of said distribution channel in accordance with heat loss.

14. In a glass distribution system according to claim 11, said distribution channel having a roof including a central depending divider extending lengthwise of said distribution channel dividing air space in said distribution channel into two separate chambers.

15. A glass distribution system for the conveyance of a stream of molten glass comprising a distribution channel having two opposite sides, conditioning means carried by said distribution channel for effecting a substantially uniform temperature cross-section across the molten glass straam within said distributicn channel, salt conditioning means extending along said opposite sides and including a separate heat-transfer system for each of said sides, each said heat transfer system including means for heating said glass and means for cooling said glass along its respective side portion, thereby the glass stream along one side of said distribution channel may be heated while the glass stream along the opposite side is being cooled.

16. In a glass distribution system according to claim 15 wherein said heating means and said cooling means are in the form of burners having separate fuel and air supplies, and wherein said air supply per se forms said cooling means.

17. In a glass distribution system according to claim 15, wherein said heating means includes burners and there are separate cooling means.

18. In a glass distribution system according to claim 15, where sasid heating means includes burners and there are separate cooling means in the form of air supply means.

* * * * *